G. SEIBT.
CURRENT INDICATING APPARATUS FOR DIRECT READING WAVE METERS FOR HIGH FREQUENCY OSCILLATIONS.
APPLICATION FILED OCT. 18, 1911.

1,228,065.

Patented May 29, 1917.

Witnesses:

Inventor
George Seibt
By his Attorney
Samuel E. Darby

UNITED STATES PATENT OFFICE.

GEORGE SEIBT, OF BERLIN, GERMANY, ASSIGNOR TO GENERAL TRANSMISSION COMPANY, OF NEW YORK, N. Y., A CORPORATION OF NEW JERSEY.

CURRENT-INDICATING APPARATUS FOR DIRECT-READING WAVE-METERS FOR HIGH-FREQUENCY OSCILLATIONS.

1,228,065. Specification of Letters Patent. Patented May 29, 1917.

Application filed October 18, 1911. Serial No. 655,383.

*To all whom it may concern:*

Be it known that I, GEORGE SEIBT, a subject of the Emperor of Germany, residing at Berlin, Germany, have made a certain new and useful Invention in Currrent-Indicating Apparatus for Direct-Reading Wave-Meters for High-Frequency Oscillations.

The object of the invention is to provide an apparatus for use in connection with direct reading wave meters for high frequency oscillations, to indicate the strength of current flowing through the meter.

A further object is to provide a current indicating apparatus for direct reading meters for high frequency oscillations which will also serve the purpose of a safety fuse for protecting the wave meter.

A further object is to provide an apparatus of the nature and for the use stated, which will also serve the purpose of lighting up the scale of the meter.

Other objects of the invention will appear more fully hereinafter.

The invention consists substantially in the construction, combination, location and relative arrangement of parts all as will be more fully hereinafter set forth, as shown in the accompanying drawing, and finally pointed out in the appended claims.

In the use of direct reading wave meters for high frequency oscillations, it is important to employ a minimum amount of current to operate the meter mechanism. A current in excess of the amount the apparatus is designed to handle causes the conductors to become overheated and the insulation to be burned out. Theoretically such meters should be independent of the exciting force. However, the friction of the bearings of the movable parts of the direct reading apparatus for high frequency oscillations has such effect on the readings of the instrument as to render the apparatus incorrect in its readings and impracticable for absolutely correct action. Moreover, it is difficult to secure absolutely perfect balance of the movable parts of the apparatus, and gravity plays an important part as a disturbing factor.

For these reasons, among others, the apparatus, in order to give accurate readings and to secure the best results, should be so designed, as above stated, as to require a minimum current for its operation, and hence the necessity for indicating to the operator the amount of current flowing through the meter apparatus, to the end that adjustment may be made so as to maintain the current at the required minimum amount.

As an illustrative example suppose the wave meter is constructed to operate normally and accurately with a current of, say, three amperes, and it is used in connection with a wireless telegraph apparatus of the high note or quenched spark type, and the coupling of the instrument with the wireless telegraph sytem is so adjusted that with, for instance, twenty spark gaps in series in the quenched spark system, three amperes of current will pass through the meter. Now suppose the energy of the wireless transmitting system is weakened from any cause, or the period or wave length is changed so that only a fraction of an ampere of current flows through the meter, the readings of the meter will then be inaccurate unless the coupling of the meter to the wireless system is correspondingly changed or varied to compensate for the variation in the energy of the transmitted current, or the variation in the period or wave length.

It is among the special purposes of my invention to provide means whereby the operator of the direct reading wave meter for high frequency oscillations may know approximately what the strength of the current is that is flowing through the meter at any given instant. It is not essential that an absolutely accurate indication be made of the current strength. Only an approximate indication is all that is required.

A simple form of means for accomplishing the objects and purposes of my invention is to place an ampere meter in series with the wave meter. For many reasons however, I prefer to employ an incandescent lamp for the purpose, the filament of which having such a thickness or transverse area dimension that it becomes heated to a dark red glow when a current of sufficient strength is flowing through it and the high frequency oscillations wave meter in series with it; said filament becoming white hot as the current increases above the normal or required amount for which the meter is designed, and becoming dark as the current decreases from the normal or required amount.

In addition to the advantage of cheapness and simplicity, the use of a small incandescent lamp possesses the further advantage of serving also as a safety fuse to protect the wave meter from overloading, and when placed on the side of the meter it may also serve the purpose of lighting up the scale of the instrument.

By the use of a current indicating device of the nature referred to in connection with a direct reading wave meter for high frequency oscillations the operator is enabled to so adjust the coupling of the meter as to maintain approximately a uniform minimum current flow through the meter and hence maintain accuracy of the readings of the instrument.

Referring now to the accompanying drawings.

Figure 1:
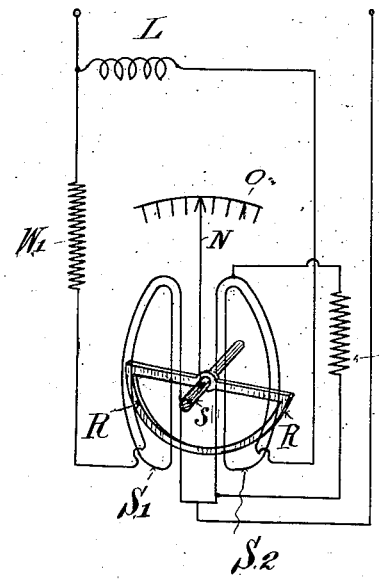
Figure 1 is a view showing a wiring diagram of a direct reading wave meter for high frequency oscillations, adapted for use in carrying out the principles of my invention.

In Fig. 1, $S_1$ and $S_2$ are flat coils placed in the same plane with each other. S is a shaft carrying a semi-circular member R, arranged alongside the coils $S_1$ and $S_2$ so as to be acted upon inductively by current flowing through said coils. A needle N is connected to shaft S, and operates in connection with a scale O. In series in the circuit of coil $S_1$, is placed an ohmic resistance $W_1$, while in series in the circuit of coil $S_2$ is placed a small self induction coil L. In shunt to a portion of coil $S_2$ is placed an ohmic resistance indicated at $W_2$. The impedance of the self induction coil L varies with the wave length or period of the oscillations passing through the circuit, while the ohmic resistance remains a fixed factor. Therefore the ratio between the currents in the coils $S_1$ and $S_2$ varies according to the changes of the wave lengths, that is, if the wave length decreases the current in coil $S_1$ increases relatively to the current in coil $S_2$. The ohmic resistance $W_2$ has the same effect of varying the ratio of the currents in coils $S_1$ and $S_2$. The member R is influenced according to the relative strengths of the current in the coil $S_1$, $S_2$. That is, if the current flowing through coil $S_1$ is stronger than that flowing through coil $S_2$ the member R and needle N will rock toward the left until the effects of the coils on said member are balanced, and vice versa.

Figure 2:
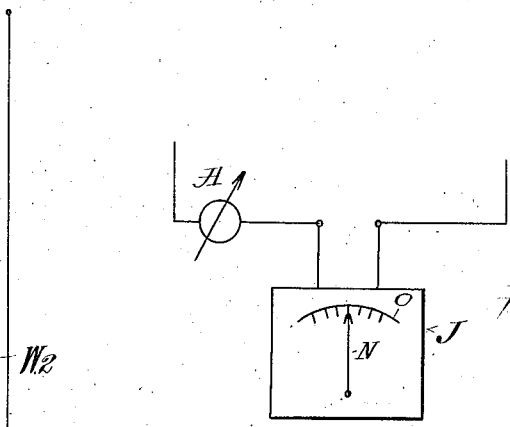
Fig. 2 is a diagram showing the use of a current or ampere meter in series with the wave meter.

In Fig. 2 I have shown an ampere meter A, arranged in series with a direct reading wave meter for high frequency oscillations of the construction above described, as a means for indicating the strength of current flowing through the meter circuit.

Figure 3:
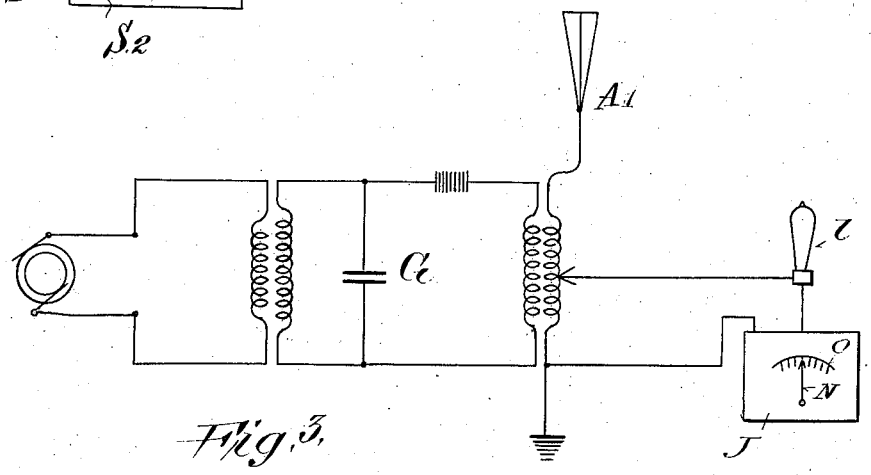
Fig. 3 is a similar view showing an incandescent lamp employed in connection with a wave meter of the type referred to, and the coupling up of the meter to an antenna system of a wireless telegraph station.
Figure 4:
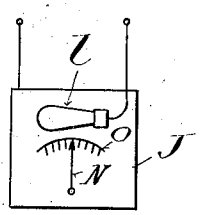
Fig. 4 is a diagrammatic view showing the arrangement of the incandescent lamp with reference to the meter so as to light up the meter scale.

In Fig. 3 I have shown a direct reading wave meter for high frequency oscillations having connected in series therewith an incandescent lamp 1, and having the circuit thereof conductively connected to an antenna system A, which is associated with a high note or quench spark energizing system G, of a wireless telegraph system. And in Fig. 4 I have shown the incandescent lamp so placed with reference to the wave meter as to light up the scale thereof.

The coupling of the wave meter circuit to the antenna system should be adjustable as shown, so that proper adjustment can be made according to the indications of the current strength indicating apparatus.

Having now set forth the object and nature of my invention and various arrangements embodying the principles thereof, what I claim as new and useful, and of my own invention, and desire to secure by Letters Patent, is:

1. The combination with a direct reading wave meter for high frequency oscillations including adjacent coils in shunt to each other, a member inductively associated with both coils and having a pointer, and means associated with one of said coils to vary the relative inductive effect thereof on the member inductively associated therewith, of means for indicating the strength of current flowing through the wave meter.

2. The combination with a direct reading wave meter for high frequency oscillations including adjacent coils in shunt to each other, a member inductively associated with both coils and having a pointer, and means to relatively vary the inductive effect of said coils, of an incandescent lamp arranged in series in the circuit of the wave meter to indicate the strength of current flowing therethrough.

3. The combination with a high frequency oscillation circuit, of a direct reading wave meter coupled to said oscillation circuit, means for indicating the strength of current flowing through the wave meter, and means for adjusting the coupling of the wave meter circuit to said oscillation circuit to maintain an approximately uniform minimum current flow through the meter.

4. The combination with a high frequency oscillation circuit, of a direct reading wave meter coupled to said oscillation circuit, said meter including adjacent coils in shunt to each other, a member inductively associated with both coils and having a pointer, and means for relatively varying the inductive effect of said coils; means for indicating the strength of current flowing through the wave meter, and means for adjusting the coupling of the wave meter circuit to said oscillation circuit to maintain an approximately uniform minimum current flow through the meter.

In testimony whereof I have hereunto set my hand in the presence of the subscribing witnesses, on this 3rd day of October A. D., 1911.

GEORGE SEIBT.

Witnesses:
F. WARREN WRIGHT,
FLORENCE M. EDENHOLM.